United States Patent
Szlam

Patent Number: 5,511,112
Date of Patent: Apr. 23, 1996

[54] AUTOMATED VOICE SYSTEM FOR IMPROVING AGENT EFFICIENCY AND IMPROVING SERVICE TO PARTIES ON HOLD

[75] Inventor: Aleksander Szlam, Norcross, Ga.

[73] Assignee: Inventions, Inc., Norcross, Ga.

[21] Appl. No.: 236,225

[22] Filed: Apr. 29, 1994

Related U.S. Application Data

[63] Continuation of Ser. No. 703,158, May 20, 1991, Pat. No. 5,309,505.

[51] Int. Cl.$^6$ .......................... H04M 1/274; H04M 11/10
[52] U.S. Cl. .............. 379/88; 379/77; 379/162; 379/214; 379/265; 379/266
[58] Field of Search ................ 379/67, 88, 89, 379/77, 162, 214, 265, 266

[56] References Cited

U.S. PATENT DOCUMENTS

| | | | |
|---|---|---|---|
| 4,071,168 | 1/1978 | Barger et al. | 379/92 |
| 4,625,081 | 11/1986 | Lotito et al. | 379/88 |
| 4,697,282 | 9/1987 | Winter et al. | 379/88 |
| 4,737,983 | 4/1988 | Frauenthal et al. | 379/221 |
| 4,797,911 | 1/1989 | Szlam et al. | 379/67 |
| 4,858,120 | 8/1989 | Samuelson | 379/309 |
| 5,020,095 | 5/1991 | Morganstein et al. | 379/134 |
| 5,155,761 | 10/1992 | Hammond | 379/142 |
| 5,181,236 | 1/1993 | LaVallee et al. | 379/89 |
| 5,214,688 | 5/1993 | Szlam et al. | 379/137 |
| 5,299,260 | 3/1994 | Shaio | 379/265 |

OTHER PUBLICATIONS

Advertisement by Rockwell International, Downers Grove, Ill., p. 17 of the Apr. 1991 Issue of Inbound/Outbound Magazine.
Inter Dial Brochure by Intervoice, Dallas, Tex., believed to be dated Jan. 1991.

*Primary Examiner*—Jeffery Hofsass
*Assistant Examiner*—Fan Tsang
*Attorney, Agent, or Firm*—Jones & Askew

[57] ABSTRACT

A method and an apparatus for improving agent efficiency by reducing non-productive time such as time on hold and time for wrap-up statements. After an agent has been connected to a call the agent may determine that automated handling of the call is appropriate. Depending upon the status of the call the agent may specify that the call has been essentially completed or that the agent is on hold. The agent may speak the name of the connected party and this will be recorded. Then the agent is disconnected from the call and a message playing device, which may also replay the spoken name, is activated. If the response from the connected party indicates that an agent's attention is again needed then the same or a different agent is connected to the call. In addition, a party on hold is provided an estimate of the time before an agent becomes available and/or the number of parties ahead in the holding queue.

4 Claims, 9 Drawing Sheets

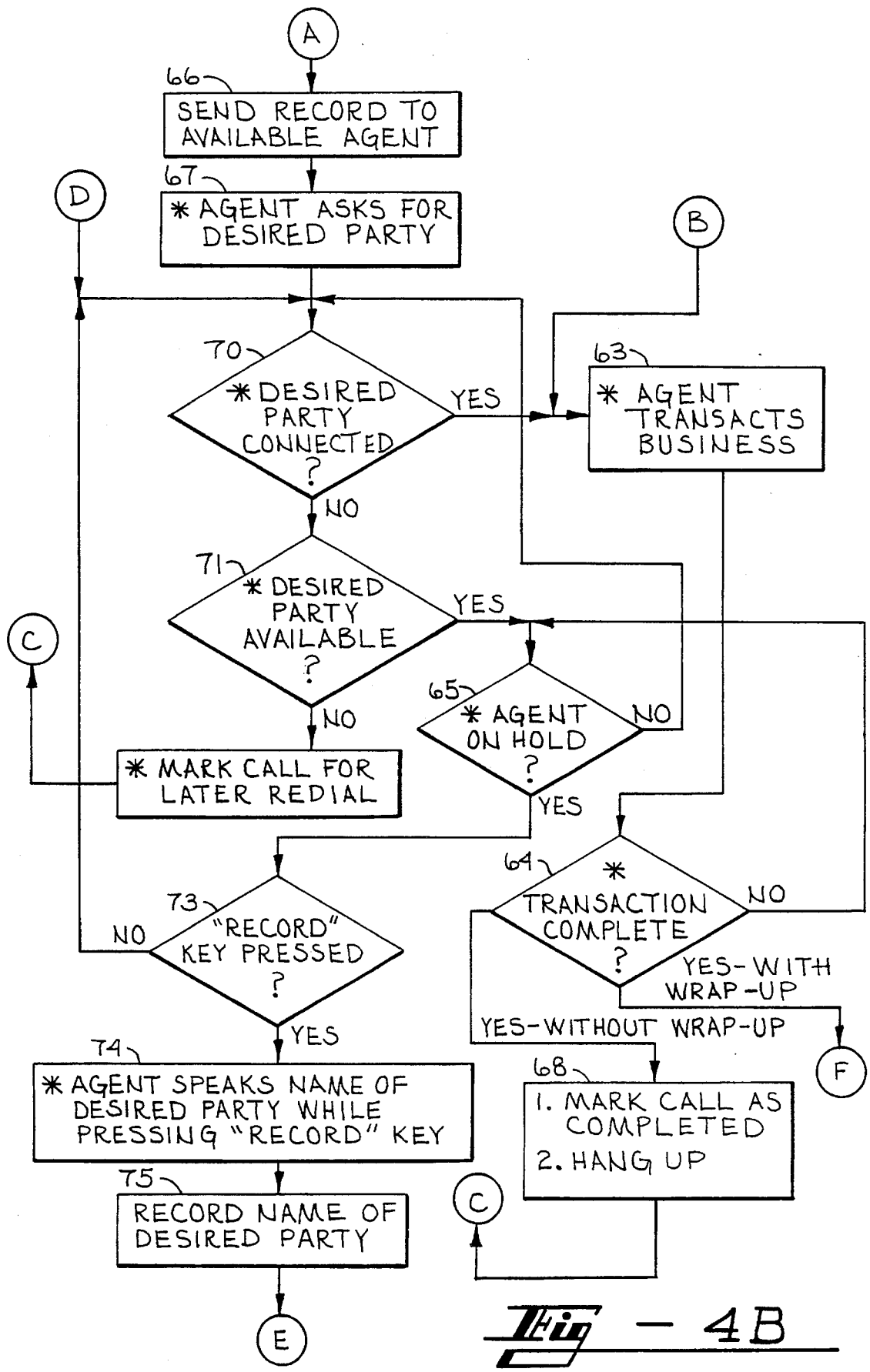

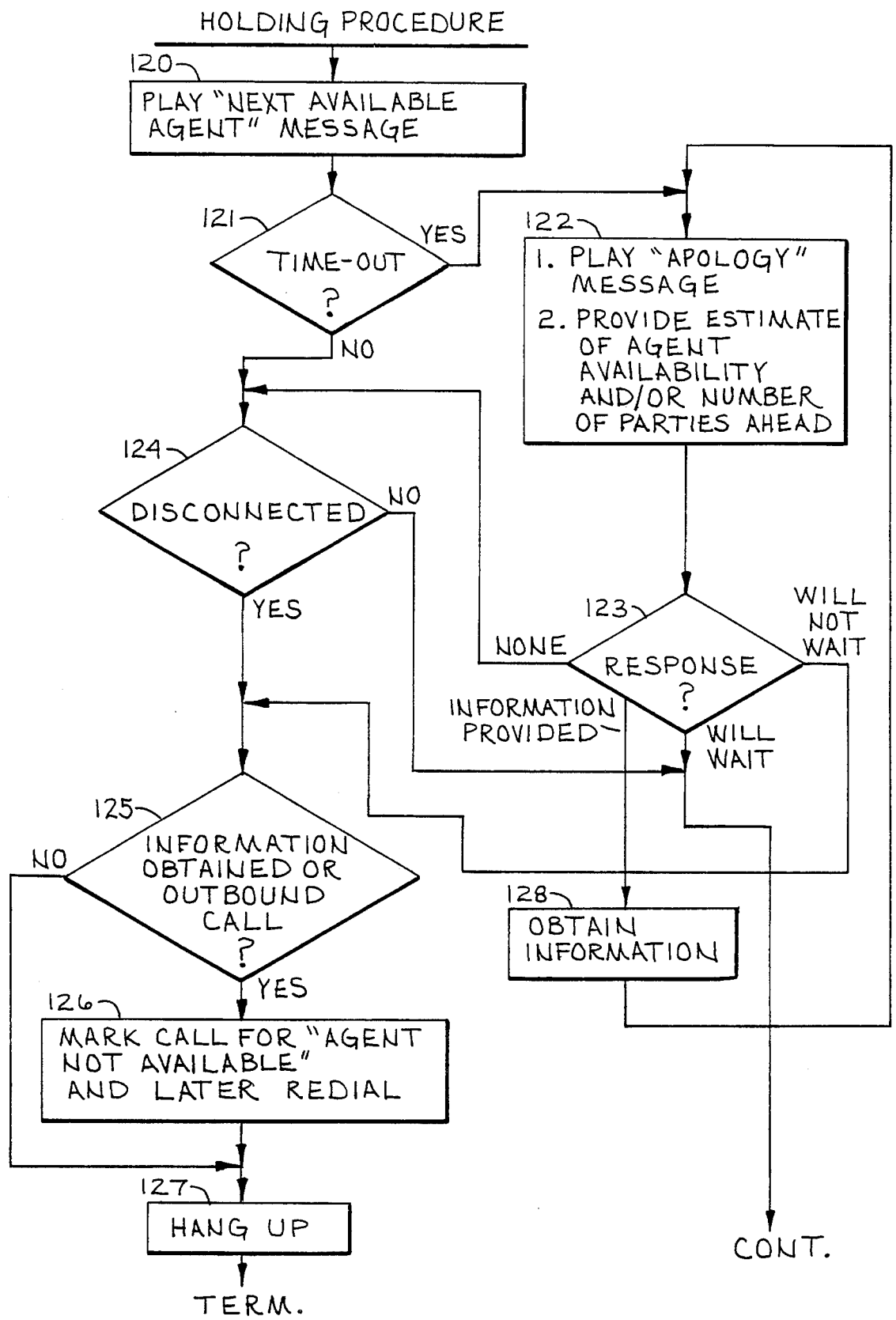

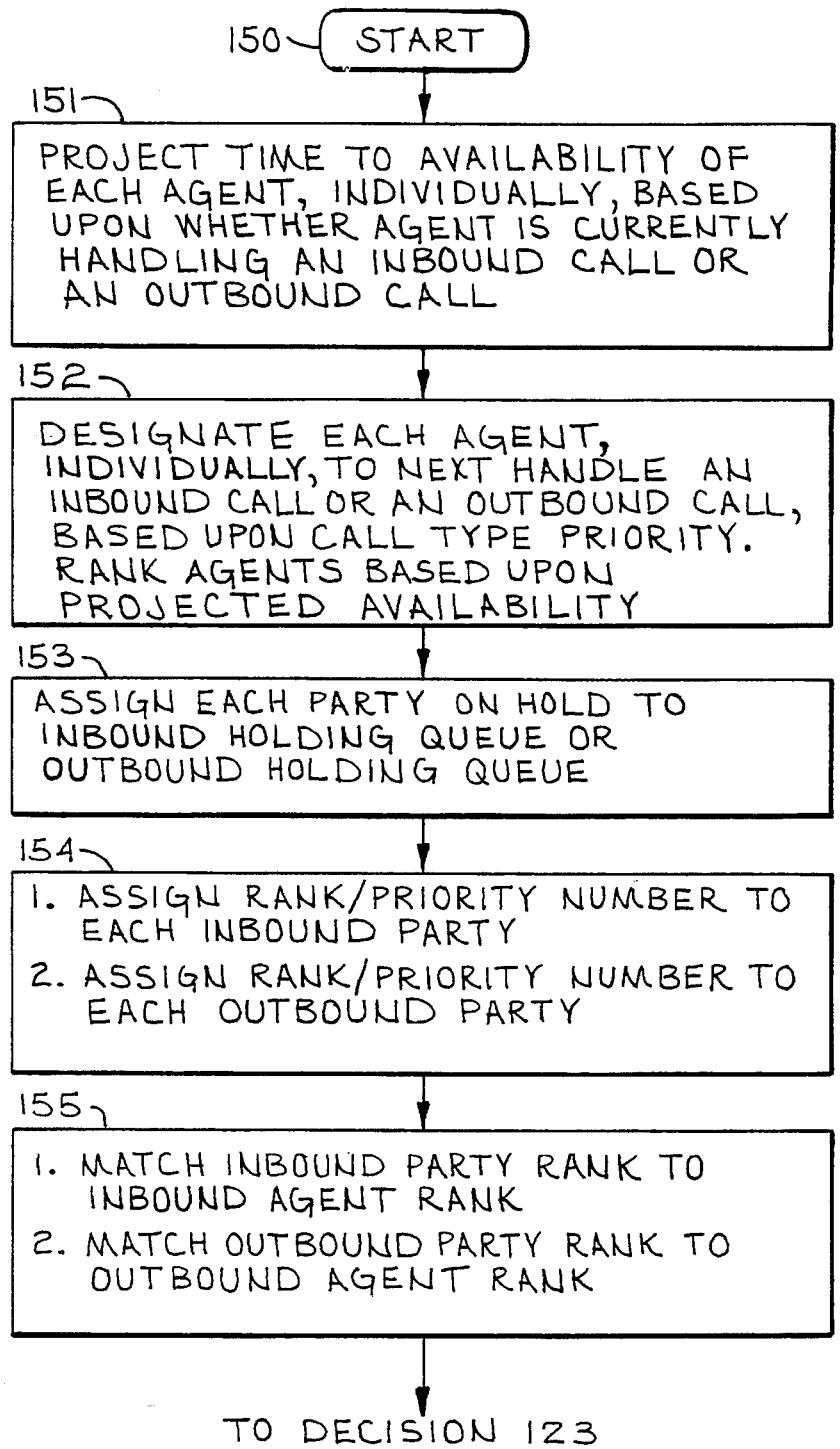

AUTOMATED VOICE SYSTEM FOR IMPROVING AGENT EFFICIENCY AND IMPROVING SERVICE TO PARTIES ON HOLD

This is a continuation of application Ser. No. 07/703,158, filed May 20, 1991, which issued as U.S. Pat. No. 5,309,505.

TECHNICAL FIELD

The present invention relates to automated dialing systems and in particular to a method and an apparatus for improving the efficiency of an agent by eliminating "agent-wait" and automating the "wrap-up" procedure and for improving the service provided to a party on hold by providing information on the holding status.

BACKGROUND OF THE INVENTION

Automated dialing systems are, in general, well known. For example, U.S. Pat. Nos. 4,797,911 and 4,894,857, both of which are assigned to the assignee of the present invention, disclose automated outbound dialing and inbound call processing system. In addition, certain other advantageous techniques are described in U.S. patent application Ser. No. 478,619, filed Feb. 12, 1990, entitled "Method For Avoiding Call Blocking", and U.S. patent application Ser. No. 533,489, filed Jun. 5, 1990, entitled "Method And Apparatus For Dynamic And Interdependent Processing Of Inbound Calls And Outbound Calls", both of which are assigned to the assignee of the present invention. These patents and patent applications are herein collectively referred to as "documents" and are herein incorporated by reference. The systems described in these documents improve the efficiency of an agent by eliminating the need for the agent to look up a customer telephone number, dialing the telephone number, waiting for the call to be answered, etc. In addition, the systems described in these documents allow certain information to be gathered without the assistance of an agent so that some incoming calls may be completely processed without agent intervention. For outbound calls the systems automatically dial the telephone number, monitor the called number for an answer and, when an outbound call is answered, automatically connect the called number to an available agent and place information regarding the called customer on the screen for the connected agent.

However, in instances where the called number is a home telephone number the desired party may not be the party who answers the phone and the agent may have to wait while the person who answers the phone locates the desired party or determines that the desired party cannot come to the telephone at that time. Likewise, if the called number is a business telephone number, the agent may be put on hold while the receptionist transfers the call to the desired party or determines that the desired party cannot be found, cannot come to the telephone because the desired party is in a meeting, etc. In such cases, the agent's time is wasted and the agent's efficiency is lowered while the agent waits for the desired party to come to the telephone or for the answering party to advise that the desired party is not available to answer the telephone.

Therefore, there is a need for a method and an apparatus which will improve agent efficiency by reducing the time that the agent is waiting and holding for the desired party to answer or for a determination that the desired party is not available.

In addition, at the end of the call, the agent may repeat to the desired party the information provided by the desired party so that the information can be verified, thank the party for his/her time or for calling, ask whether the party needs any additional information, etc. These "wrap-up" statements consume a substantial amount of time and, generally, provide very little additional information, orders, or other benefit. However, courtesy to the customer demands that these wrap-up statements be provided. Therefore, there is a need for a method and an apparatus which can improve agent efficiency by providing the wrap-up statements in a manner which provides the required courtesy and at the same time allows the agent to immediately begin handling the next call.

Circumstances occasionally arise in which the connected party is placed on hold because the connected party desires or requires the assistance of an agent and no agent is immediately available. Typically, music and/or a prerecorded message is played to the connected party. Unfortunately, the connected party has no indication of whether an agent will be available in ten seconds, ten minutes, or an hour. This leads to frustration on the part of the connected party because the connected party may prefer to call back at a later time rather than wait for an agent to become available if the wait time is going to exceed some party-defined limit. Therefore, there is a need for a method and an apparatus which notifies the connected party of the approximate wait time before an agent becomes available so that the connected party can decide to whether to hold, call back, or request a call from an available agent.

SUMMARY OF THE INVENTION

The present invention provides a method and an apparatus whereby an agent may be relieved of the duties of waiting on hold and providing, wrap-up statements. When an agent is connected to a call and the agent is put on hold the agent presses a key which indicates that the agent has been placed on hold. This causes the agent to be disconnected from that call and connected to another call. At the same time, a message is played on the telephone line indicating that an agent will return to assist the party if the party presses a key on the telephone key pad or verbally indicates his/her presence. When the party has indicated his/her presence the first available agent will be connected to the party. If the agent who previously handled the call is available to then that particular agent will be reconnected to the call. In both cases, any available customer information will be displayed to the agent when the agent is connected/reconnected.

When the agent determines that the desired transaction has been completed and the only remaining tasks are the wrap-up statements then the agent may press another key. This will cause the agent to be disconnected from the call and connected to another call. At the same time, one or more prerecorded messages are played to the connected party. These messages may be in the voice of the agent who was previously connected or may be in the voice of another person. When required, such as for verification of previously-entered information, this process may be interactive so that a signal from party indicating verification of the information causes the next piece of information to be presented for verification and a signal indicating that the information is incorrect causes an agent to be connected to the party. If the agent which was previously connected to the party is available then that agent will be reconnected to the party. In both cases, any available customer information will be displayed to the agent when the agent is connected/ reconnected.

A typical system for implementing the present invention has: a host computer, such as a mainframe computer, for storage and retrieval of data; a plurality of agent terminals; a PBX/ACD/switch for connecting telephone trunk lines to agent terminals or trunk interface units: trunk interface units for monitoring the status of the telephone trunk lines and performing automated interaction with the connected party; and a controller for controlling and coordinating the activities of the other components. The trunk interface units have dialers for placing outbound calls, answer detection devices for detecting an answer to an outbound call, digital voice playback and recording devices for placing and/or recording messages, and devices for detecting an incoming call and receiving, from the telephone company central office, information regarding that incoming telephone call.

The present invention therefore allows an agent to indicate to the system that the agent is no longer needed, or at least is not needed for some undetermined time, so that the system can interact with the connected party to the extent possible and, when necessary, again connect an agent to the connected party. The system will reconnect the same agent to the connected party if that agent is available but, otherwise, will simply connect the next available agent. In both cases, any available customer information will be displayed to the agent when the agent is connected/reconnected.

Therefore, it is an object of the present invention and an advantage provided by the present invention to reduce the on-hold time of an agent by allowing the agent who has been placed on-hold to be connected to another call and connecting an agent to the previous call when the connected party returns to the line.

It is another object of and an advantage provided by the present invention to reduce the wrap-up time of an agent by allowing the agent to indicate that the agent is no longer needed for that call, connecting the agent to another call, and automatically interacting with the connected party until completion of the call or until the connected party indicates that an agent is required.

The present invention advises the connected party of the approximate time before an agent will be available and/or advises the connected party of the number of parties in the holding queue ahead of the connected party. The present invention also queries the connected party to determine whether the connected party would like to continue holding or would like to have an agent return the call. This allows the connected party to make a decision as to whether to continue holding, to call back at a later time, or ask that an agent return the call. The present invention uses statistics on agent performance, such as those used in the outbound call pacing algorithm, and the number of parties ahead of the connected party, to predict the amount of time before the party on hold will be connected to an agent.

In accordance with the present invention, call durations and call volume, for both inbound calls and outbound calls, are measured and used to compile statistics which, in turn, are used to generate predictions (estimates) of anticipated future call durations and volumes. The compilation and prediction process is preferably performed for each individual agent so that the time when a busy agent will become available may be accurately predicted. Also, statistics are compiled for the outbound call connect ratio (the ratio of the number of answered outbound calls to the number of placed outbound calls). The above statistics are then used to generate call pacing rates. These techniques, described in the referenced documents, provide excellent results in that the productivity of each agent is maximized by keeping the agent connected to a party (as opposed to an unanswered call) at, or nearly at, all times.

Furthermore, as described in the referenced documents, the availability of each individual agent can be predicted. This, combined with a measurement of the number of parties on hold, and the time that each party has been on hold, allows the use of real-time voice messages to advise the party on hold of the number of parties ahead of that party and/or the expected time before that party will be connected to an agent. This allows the party to make an informed decision as to what action the party may want to take, thereby increasing the quality of the service provided to the customer and substantially increasing customer satisfaction.

Therefore, it is an object of the present invention and an advantage provided by the present invention to determine the amount of time before a party on hold will be connected to an agent and/or the number of parties in the holding queue ahead of the connected party, to provide this information to the party on hold, and allow the party on hold to make an informed decision with respect to continuing to hold, calling back later, or requesting that the call be returned.

It is another object of the present invention and an advantage provided by the present invention that statistics, such as those used in or provided by call pacing algorithms, be used to determine the time before a particular party on hold will be connected to an agent.

BRIEF DESCRIPTION OF THE DRAWING

FIGS. 4A–4F are detailed flow charts illustrating the preferred operation of the present invention.

DETAILED DESCRIPTION

Figure 1:
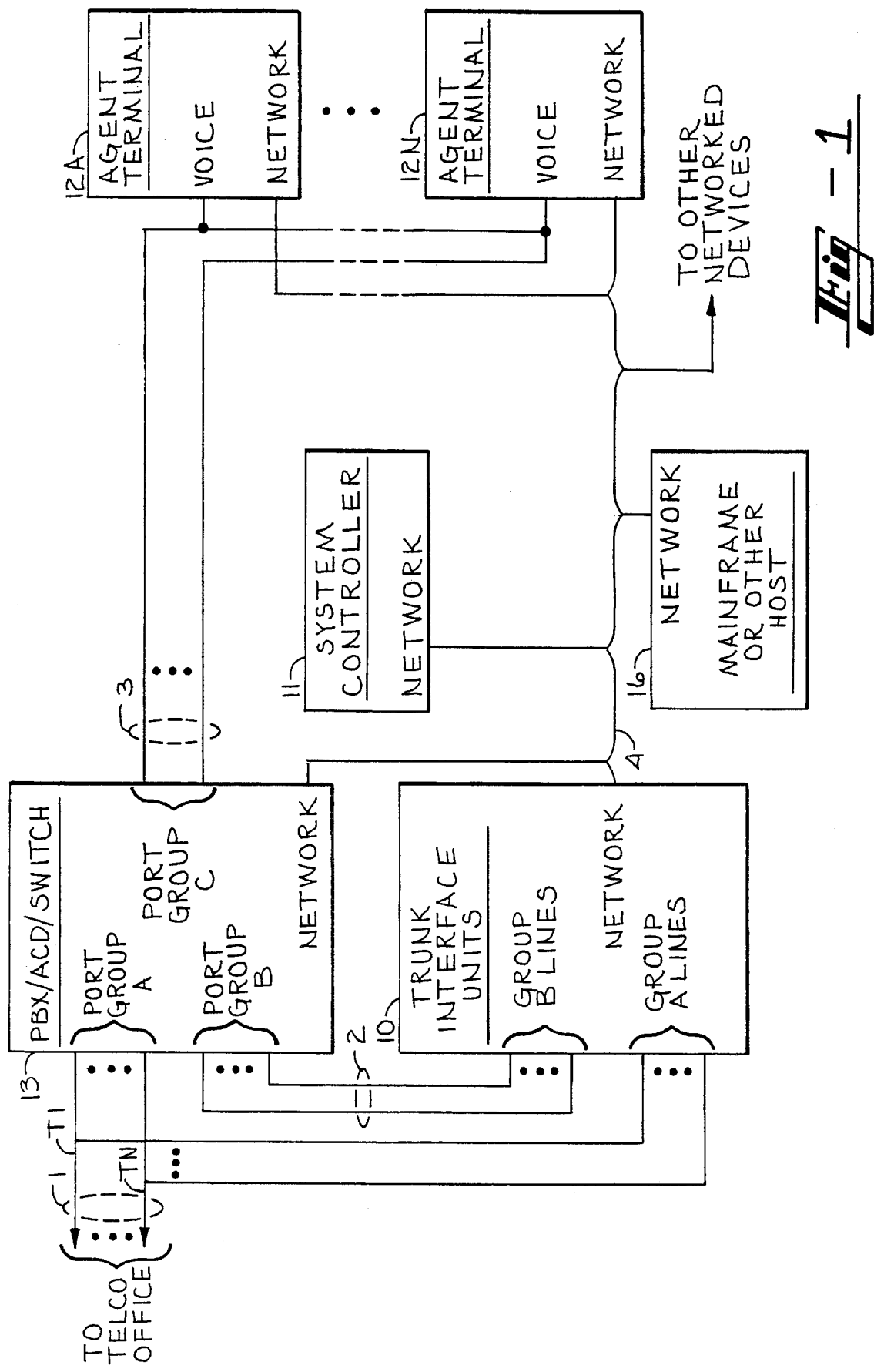
FIG. 1 is a block diagram of the preferred environment of the present invention.

Turn now to the drawing, in which like numerals represent like components throughout the several figures. FIG. 1 is a block diagram of the preferred environment of the present invention. The basic principles of operation of this type of system, excluding the present invention, have been described in detail in the referenced documents. The preferred embodiment comprises trunk interface units 10 such as commercially available audio response units (ARU), voice response units (VRU), and interactive voice response units (IVR), a system controller 11, a PBX or ACD or cross-point switch 13, a mainframe computer or host 16, and agent terminals 12A–12N. Trunk lines T1–TN, collectively designated as trunks 1, may be conventional analog trunks, T1 trunks, or ISDN trunks, as determined by the desirability and availability of trunk types provided by the local telephone company. In addition, automatic number identification (ANI) and dialed number identification service (DNIS) information may be provided by the telephone company over trunks 1. Trunk lines 1 are, in one embodiment, only connected to port group A of private branch exchange/ automatic call distributor/switch (PBX/ACD/switch) 13 and, in another embodiment, are also connected to the group A lines port of trunk interface units 10. Port group B of PBX/ACD/Switch 13 is connected by bus 2 to the group B lines port of trunk interface units 10.

Trunk interface units 10 typically perform trunk seizure, dialing, call progress monitoring, message playing, message recording, voice recognition and analysis, voice conversion, voice storage, voice playback, dual tone multifrequency (DTMF) decoding, and decoding of ANI and DNIS call data provided by the telephone company central office. Alternatively, PBX/ACD/switch 13 may perform the functions related to outbound call placement and inbound call detection and initial handling, and the trunk interface units 10 may primarily perform voice and DTMF processing functions.

Each agent terminal 12 has an audio communications device (not shown), such as a headset, for connection to the VOICE port, a display screen (not shown), a keyboard (not shown), and a control/data NETWORK port. System controller 11, trunk interface units 10, and PBX/ACD 13 also have a control/data NETWORK port. In the preferred embodiment the NETWORK port of trunk interface units 10, system controller 11, agent terminals 12, PBX/ACD 13, and mainframe/host 16 are connected together by an Ethernet or token ring network 4.

It will be appreciated that many different communication link/network topologies and protocols may be used to interconnect devices 10/13 and 16. For example, parallel topology, star network topology, double-network topology, zoned-network topology, multiple local-area and/or wide-area network topology, etc., may be used. In addition, depending to some degree upon the topology chosen and the communications data rates required, the technology used to implement the network is non-critical and may be fiber optic cable, coaxial or triaxial cable, twisted pair (shielded or unshielded), multiple-conductor parallel bus, etc. The particular topology, protocol, command set, etc., actually used in a given installation will depend upon the customer's cost and space requirements, existing equipment and/or networks, and projected needs for future expansions. It should therefore be understood that the scope of the present invention is not limited by or to any particular network topology, communications link or protocol, command set, technology, or language.

The grouping and labeling of the ports of PBX/ACD 13 is for convenience. In the preferred embodiment, any port may be configured as a trunk port, as in group A, or an extension port, as in groups B and C. Therefore, trunk lines 1 may be connected by PBX/ACD 13 to trunk interface units 10 via bus 2 and to agent terminals 12 via bus 3. Also, trunk interface units 10 may be connected via busses 2 and 3 and PBX/ACD 13 to agent terminals 12. Device 13 may be a simple switch which acts upon received instructions, or may be an intelligent switch (PBX or ACD) which receives some instructions but performs certain operations in response to current conditions and sends a signal indicating the action taken, such as routing a call to an agent terminal 12 or trunk interface unit 10. Device 13 may receive the instructions from trunk interface units 10, system controller 11, and/or mainframe 16. Similarly, device 13 may send the signal indicating the action taken to devices 10, 11, and/or 16.

In the preferred embodiment, system controller 11 and each agent terminal 12 comprises a computer having memory such as read only memory (ROM), random access memory (RAM), and disk drives, such as an IBM PS/2, although other computers may be used.

Network 4 may be connected to other devices.

System controller 11 controls and/or monitors certain functions, such as obtaining information from mainframe 16, placing outbound calls, designating a trunk line as an inbound trunk and/or an outbound trunk, generating performance statistics, and implementing the call pacing/agent allocations/trunk line allocation algorithms. These functions of system controller 11 and the manner in which they are implemented are described in more detail in the referenced documents.

Batch mode transfer from mainframe computer 16 to system controller 11 is preferred but, if desired or required by the limitations of the applications software of mainframe computer 16, system controller 11 can obtain information from mainframe 16 one account at a time. Also, depending upon the previously installed program in host 16, system controller 11 may obtain full account information, abbreviated account information, or compilations of certain account information such as, for example, a calling list. System controller 11 coordinates and/or performs such functions as causing a trunk interface unit 10 to seize a trunk line, dial a customer telephone number, monitor the status of the outgoing call, detect an incoming call, answer an incoming call, play messages and determine the response from the called/calling party, record a called/calling party's response, etc. These functions of system controller 11 and the manner in which they are implemented are described in more detail in the referenced documents. Trunk interface units 10 may also be instructed to record and play back the agent's greeting, the announcement of the name of the called party, closing statements, etc., as described herein.

Also, although trunk interface units 10, system controller 11, and mainframe 16 are shown as distinct, separate devices, each performing a specified function or set of functions, the present invention is not limited to such an arrangement. In particular, many of the functions can be performed by any of these devices, and the allocation of a particular function to a particular device or devices is a matter of design choice and will typically be determined by the available processing power of the devices, the users determination as to how much of the processing time of mainframe 16 may be used for call pacing, detection, processing, etc., the physical constraints of the user's site such as the maximum size of any one device, or the number of devices or cables that may be used, etc. For example all logic functions could be performed by mainframe 16 or system controller 11.

Furthermore, if desired, most or all of the logic and memory functions could be performed by mainframe 16, thereby eliminating the need for a separate system controller 11 and trunk interface control unit 10*a*13. Again, this is a design choice and will typically be based upon one or more of the factors listed above.

Consider now the outbound dialing operation of the preferred embodiment. Mainframe computer 16 will provide, by a batch transfer or online transfer, the customer account information for a desired number of accounts to system controller 11. System controller 11 then extracts, for each account, the name of the customer, the customer telephone number, the account number, and/or some type of mainframe database index number. Assume that trunk T1 is available. System controller 11 will indicate that trunk T1 is designated and provide the customer telephone number to trunk interface units 10, which causes trunk interface units 10 to seize trunk T1, dial the customer telephone number, and then monitor trunk T1 for the status of the call. If, as shown in FIG. 1, trunk lines 1 are directly connected to trunk interface units 10 then trunk interface units 10 can place the outgoing call without intervention of PBX/ACD 13. However, if trunk lines 1 can be connected to trunk interface units 10 only through port group B of PBX/ACD 13 then, when system controller 11 provides the customer telephone number to trunk interface units 10, system controller 11 will also instruct PBX/ACD 13 to connect trunk line T1 to trunk interface units 10. Alternatively, PBX/ACD 13 may be capable of detecting the on hook/off hook status of a device connected to port group B and, therefore, when trunk interface units 10 seize a line of group 2 PBX/ACD 13 will automatically connect trunk interface units 10 to a trunk line.

If trunk interface units 10 are not directly connected to trunks 1 then system controller 11 will instruct trunk interface units 10 which of the group B lines to use to place the call and will instruct PBX/ACD 13 to connect that group B line to trunk T1 so that trunk interface units 10 are connected to trunk T1 through PBX/ACD 13. Also, if PBX/ACD 13 has the capability to seize (go off-hook) trunks and dial telephone numbers then system controller 11 may instruct PBX/ACD 13 to seize trunk T1 and dial the specified telephone number. In this case system controller 11 will simply direct trunk interface units 10 to monitor the status of trunk T1, either directly (group A lines) or through PBX/ACD 13 (group B lines). If PBX/ACD 13 has the capability to perform call progress monitoring and/or to detect incoming calls then PBX/ACD 13 may report the call status to system controller 11 and trunk interface unit 10 may simply monitor and decode voice messages and DTMF tones.

If trunk interface units 10 advise system controller 11 that the called number is busy, or is not answered, system controller 11 will mark, in its memory (not shown), the account accordingly and place the account in the queue to be tried again later.

Figure 2:
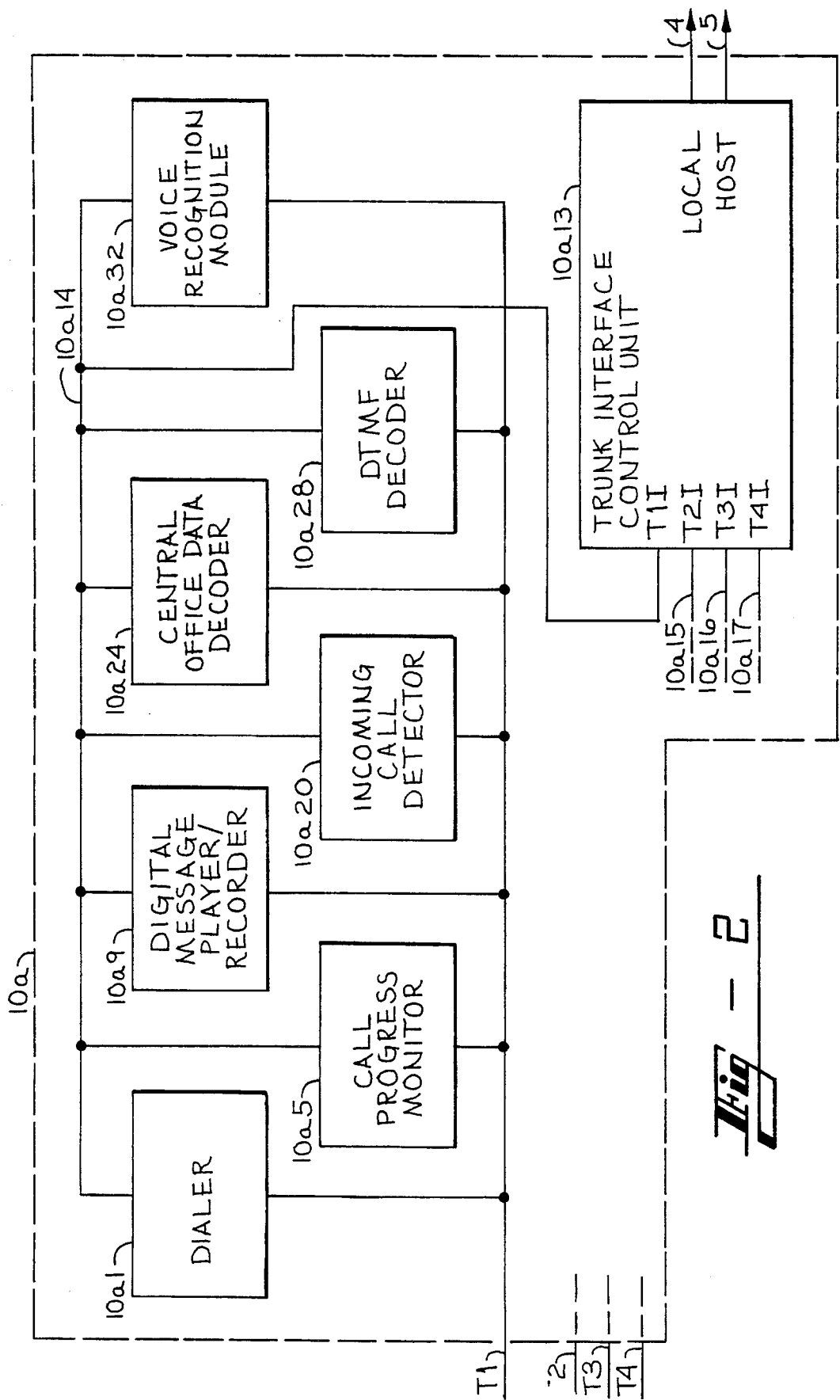
FIG. 2 is a block diagram of a trunk interface unit of the preferred embodiment of the present invention.

Referring briefly to FIG. 2, which is a block diagram of a typical trunk interface unit 10a, it will be seen that a trunk interface unit, comprises a dialer 10a1, a call progress monitor 10a5, a digital message player recorder/device 10a9, an incoming call detector 10a20, a decoder 10a24 for decoding telephone company office data such as data for automatic number identification (ANI) and dialed number identification service (DNIS), a dual tone, multifrequency (DTMF) decoder 10a28, a voice recognition module 10a32, and a trunk interface control unit 10a13, which includes a microprocessor and associated memory (not shown), such as ROM, RAM, and disk drives, for storing instructions and data. The basic construction and operation of trunk interface units 10 are explained in more detail in the referenced documents.

Returning to FIG. 1, assume now that the customer answers the call. Trunk interface units 10 will advise system controller 11 that the call has been answered. If an agent is available, system controller 11 will send the abbreviated information (telephone number, customer name, account number, and/or database index number) to, for example, agent terminal 12A, direct PBX/ACD 13 to connect trunk T1 to agent terminal 12A, and then direct trunk interface units 10 to release trunk T1. If trunk interface units 10 are not directly connected to trunk lines 1 then, if an agent is available, system controller 11 will send the abbreviated information to the agent terminal and direct PBX/ACD 13 to disconnect the trunk from port group B and connect the trunk to port group C. Of course, the particular port of port group C that is selected will be the one that corresponds to the agent terminal 12 to which system controller 11 has sent the abbreviated information.

In the event that an agent is not available system controller 11 will not instruct interface units 10 to release the trunk line. In this case trunk interface units 10 will automatically start the message player 10a9 or begin an interactive or holding session with the called party. The called party may never hear a message because, if an agent is available, the agent will be immediately connected to the called party. Also, call cancellation, as described in the referenced documents, may be used to reduce the number of calls answered without an agent being available. Agent terminal 12A will display the abbreviated information for the agent so that, as soon as the agent at agent terminal 12A is connected with the called party, the agent has at least the abbreviated customer account information. The agent may obtain the full account information by pressing one or more keys on the keyboard of the terminal 12A, which causes terminal 12A to request the full account information from mainframe 16. Alternatively, system controller 11 may instruct mainframe 16 to send the full account information to agent terminal 12A for display. Also, upon receiving the abbreviated account information from system controller 11, terminal 12A may, without prompting from the agent, immediately request the full account information from mainframe 16.

Once connected, the agent can then discuss the matter or reason for which the customer was called, for example, discussing a late payment account, collecting on a delinquent account, verifying an order, updating customer account information, etc., while being directly connected, online, to mainframe 16.

It may happen that the party who answered the call is not the desired party. In this case the agent may be placed on hold or otherwise left unattended while the answering party attempts to locate the desired party, determine if the desired party can or will take the call, etc. This constitutes wasted time and therefore reduces the efficiency and productivity of the agent. In the preferred embodiment, the agent presses a key on the keyboard of terminal 12A and speaks the name of the desired party. This key signals system controller 11 that the agent is on hold and should be connected to another call. This key also signals trunk interface unit 10 to record the spoken name of the desired party, which is accomplished by enabling recorder 10a9 and storing the output of recorder 10a9 in the memory of the trunk interface control unit 10a13 or, optionally, in the memory of system controller 11. Controller 11 will then cause the agent to be transferred to another call, thus reducing wasteful on-hold time and increasing agent efficiency.

Trunk interface unit 10 will then play a message which plays back the previously spoken and recorded name of the desired party and which instructs the connected party to signal his/her presence in a specified manner. An agent may also prerecord selected messages in his/her own voice so that both the message and the name of the desired party will be played using the recorded voice of the previously connected agent. In another embodiment, the selected messages are prerecorded, but not necessarily in the voice of any agent. In this case, when the agent presses the key, the selected message will be played and the name of the desired party will be inserted, the name being the name previously spoken by the agent and stored by trunk interface units 10 or system controller 11.

When a party signals his/her presence, in the specified manner, system controller 11 will first attempt to connect the party with the previously connected agent. If that agent is not available then system controller 11 will connect the party with any available agent. If an agent is not available then system controller 11 will cause an "apology" message to be played and connect an agent when one becomes available or note that the party has chosen not to wait for an available agent. The apology message may also include a statement as to the projected amount of time before an agent will be available or the number of persons in the holding queue who are ahead of that party.

Assume now that an agent was not available when the party who was called on trunk T1 answered. Trunk interface unit 10*a* starts the message player/recorder 10*a*9 and advises system controller 11 that the called party has answered. After ascertaining that an agent is not available, system controller 11 will allow trunk interface unit 10*a* to continue playing the desired prerecorded message to the called party. As soon as system controller 11 determines that an agent is available, system controller 11 will cause PBX/ACD 13 to connect the available agent terminal 12 to trunk T1, direct trunk interface unit 10*a* to become available for the next call and release trunk T1 if the trunk is being held via the group A port of trunk interface unit 10, direct unit 10*a* to stop the message, and send the abbreviated customer account information to the available agent terminal 12. Again, the agent will have the customer account information when the customer is connected and can then begin to discuss the reason for which the customer has been called.

When the agent at agent terminal 12A has concluded the transaction with the customer, the agent may press a telephone trunk release key on the keyboard at terminal 12A to indicate that trunk T1 should be released. Terminal 12A sends the trunk release signal to system controller 11. System controller 11 then directs PBX/ACD switch 13 to disconnect terminal 12A from trunk T1. Of course, the trunk release signal sent by terminal 12A could also directly cause PBX/ACD 13 to disconnect terminal 12A from trunk T1. System controller 11 then sends the next telephone number to trunk interface units 10 and directs trunk interface units 10 to seize trunk T1 and dial this next telephone number. If another connected party is available, then system controller 11 will cause that connected party to be connected to the now-available agent.

When the agent at agent terminal 12A has completed entering any new data for the particular customer account then the agent at terminal 12A may press a terminal release key on the keyboard. Terminal 12A then advises system controller 11 that the agent at agent terminal 12A is available for the next call. System controller 11 then causes PBX/ACD 13 to connect the next customer to agent terminal 12A and sends the abbreviated customer account information to terminal 12A for display on the screen. Therefore, as soon as the agent at agent terminal 12A has indicated that processing of one customer account is completed, system controller 11 connects that agent with the next called party. The result is that the agent's time is more efficiently and more completely utilized.

It may also happen that an agent has concluded the transaction with the connected party but there are certain wrap-up or closing statements that should be made for courtesy, to comply with the law, or to confirm information. The statements may or may not be interactive, as appropriate. In the preferred embodiment, selected wrap-up messages are prerecorded in the voice of each individual agent. System controller 11 then causes the wrap-up statements to be played using the prerecorded voice of the agent who was last connected. In another embodiment, the wrap-up statements are not necessarily in the voice of any particular agent and no attempt is made to use the prerecorded voice of any particular agent.

The selected, prerecorded messages may be stored in analog or digital form on message player/recorder 10*a*9, or stored in digital form in the memory of trunk interface unit 10*a* or the memory of system controller 11. The result is that the agent has been relieved of the duty of conducting the non-productive wrap-up messages and may therefore be connected to another call while the wrap-up messages are being played.

The agent may also press a key which, in addition to causing the wrap-up message to be played, also causes recording of words spoken by the agent. These words, such as the name of the connected party, may then be mixed in with the message so as to maintain the appearance of a live agent still being connected.

It will also be appreciated that the operation of trunk interface units 10 and system controller 11 is transparent to the host 16 and to the agent. System controller 11 automatically processes each call and routes the call to the first available agent. Therefore, any changes to the customer account information made by the agent are immediately provided to mainframe 16, which automatically and instantly updates the customer account information. Furthermore, because of the automatic updating, any information provided to an agent is the most current information.

In the preferred embodiment, system controller 11 typically sends only the abbreviated customer account information to an agent terminal 12. However, if system controller 11 has sufficient memory capacity then system controller 11 may retain the entire file for a customer account and send this entire record to the agent terminal, thereby eliminating the steps of sending the abbreviated account information to the agent terminal, sending the account number, telephone number, and/or database number to mainframe 16 and then causing the full account information to be sent from mainframe 16 to the agent terminal.

Return now to FIG. 2 which is a block diagram of a typical trunk interface unit 10*a* constructed to handle both incoming and outgoing calls. As previously stated, a trunk interface unit 10*a* preferably contains such resources as a dialer 10*a*1, a call progress monitor 10*a*5, a message player/recorder 10*a*9, an incoming call detector 10*a*20, a data decoder 10*a*24, a DTMF decoder 10*a*28, and a voice recognition module 10*a*32. Dialer 10*a*1, call progress monitor 10*a*5, message player/recorder 10*a*9, incoming call detector 10*a*20, and decoders 10*a*24 and 10*a*28, and voice recognition module 10*a*32, are all connected to trunk T1. Also, these devices are connected by bus 10*a*14 to the T1I port of trunk interface control unit 10*a*13. A single trunk interface control unit 10*a*13 controls the operation of a plurality of the above resources for a plurality of trunk lines 1. If trunk interface units 10 are connected to trunk lines 1 via PBX/ACD 13 then PBX/ACD 13 may be responsible for detecting an incoming call, seizing the trunk line, and connecting trunk interface unit 10 resources (player/recorder, decoders, voice recognition modules, etc.) to the trunk which has the incoming call.

If trunk interface units 10 are directly connected to trunk lines 1, incoming call detector 10*a*20 will monitor trunk T1 and advise trunk interface control unit 10*a*13 when an incoming ringing signal appears on trunk T1. In the preferred embodiment, trunk interface control unit 10*a*13 will report an incoming call on trunk T1 to system controller 11. Upon detecting an incoming call on trunk T1 trunk interface control unit 10*a*13 may direct decoder 10*a*24 to obtain the telephone number of the calling party (ANI) or the number called (DNIS), or both, and direct message player/recorder 10*a*9 to seize the line and begin playing the prerecorded message. Alternatively, system controller 11 may instruct trunk interface control unit 10*a*13 to direct decoder 10*a*24 and message player/recorder 10*a*9 to perform these functions. If trunk interface units 10 are connected to trunk lines 1 via PBX/ACD 13 then PBX/ACD 13 will report the incoming call to system controller 11. The appropriate resources in trunk interface units 10 will then be connected to trunk T1 through PBX/ACD 13. The connection may be done automatically by PBX/ACD 13, or in response to a command from system controller 11. The message played by message player/recorder 10a9 may be a simple message advising the party that an agent will be connected as soon as one becomes available or, in conjunction with DTMF decoder 10a28, may conduct an interaction session and query the customer for more information such as the customer's telephone number, account number, purpose of call, amount of payment, etc.

Furthermore, in some areas of the country, the local telephone office provides a service, sometimes called automatic number identification (ANI). In areas where ANI is available the central office will provide signals which can be decoded to yield the number from which the calling party is calling. In this case, a decoder, such as decoder 10a24 would provide the calling party's telephone number to trunk interface control unit 10a13. Trunk interface control unit 10a13 would then provide the calling party telephone number to system controller 11. System controller 11 would then request mainframe 16 to provide the customer account information based upon the calling party telephone number.

If the calling party telephone number does not correspond to the telephone number for an existing client then, when an agent becomes available, system controller 11 will connect the calling party to the available agent and also provide the calling party telephone number to the agent terminal for manual input. In addition, where Dialed Number Identification Service (DNIS) is available the central office will provide signals which can be decoded to yield the number which the calling party dialed. This is useful where the installation has a large block of numbers, connected in rotary fashion, so that when the calling party appears, for example, on trunk T4, it can be determined whether the calling party was, in fact, calling the telephone number corresponding to trunk T4 or was calling the telephone number corresponding to trunk T1 and was then rotated down to the first available trunk, trunk T4. Some installations, even though having the rotary telephone lines, have different numbers for different departments and the call may be routed or handled differently depending upon the number that the calling party actually dialed. This information is also provided to system controller 11 so that system controller can route the call to the proper agent or group of agents, start the proper message playing, etc. The agent can then conduct business with the calling party, obtain other information from the calling party, such as a name and/or an account number, enter this information via the keyboard to obtain the customer account information from mainframe 16, establish an account for a new customer, etc.

However, if the calling party telephone number corresponds to the telephone number of an existing client in the database, then mainframe computer 16 will provide this information either to system controller 11 or to the next available agent terminal. When an agent becomes available, system controller 11 will provide the abbreviated customer account information to the available agent terminal. The agent terminal will then, as previously described, obtain the full customer account information from mainframe 16. The agent can then conduct the necessary business with the customer.

DTMF decoder 10a28 allows the customer to provide certain information via the DTMF keypad on his telephone set. For example, assume that ANI service is not available in the area. Upon being advised of an incoming call, trunk interface control unit 10a13 or system controller 11 will cause message player 10a9 to seize the line and begin playing the first prerecorded message. The first prerecorded message may be, for example, a message asking the calling party to key in the DTMF digit 1 if the calling party has an established account and the digit 2 if the calling party does not have an established account. Other prerecorded messages on message player 10a9 may query the customer and ask for an appropriate DTMF keypad response as to whether the customer wishes to open a new account, change an existing account, place, change or cancel an order, etc. Therefore, message player 10a9 may play messages, the particular message to be played being determined by the numbers which the calling party keyed in over his/her DTMF keypad. The messages may be stored in memory in message player 10a9, trunk interface control unit 10a13, or system controller 11. A message on message player 10a9 may ask the calling party to key in his telephone number and/or account number. This information would then be provided via trunk interface control unit 10a13 to system controller 11. When an agent becomes available, system controller 11 sends the information collected to the agent terminal for display upon the screen. Then, either automatically or in response to an agent keystroke, the agent terminal sends the collected information to mainframe 16. Mainframe 16 then provides the full customer account information to the agent terminal. Also, system controller 11 might instruct mainframe 16 to provide the full customer account information to the agent terminal.

It will be appreciated that the messages stored and played need not be of a single language. The customer account file may have a field specifying the preferred language of the customer so that any messages played to that customer are played in the preferred language of that customer. Likewise, the voice recognition module 10a32 may be programmed so as to recognize or not recognize different sounds, depending upon the language selection field. If the preferred language of the customer is unknown then a message can be played in one or more languages specifying a code to be entered or a word to be spoken when the desired language is announced. Therefore, the present invention is useful in multi-language environments.

In addition, when an operator logs on system controller 11 may retrieve, from its own memory or from mainframe 16, a field specifying the language capability of that particular agent. Then, if the customer has indicated a language preference, system controller 11 will attempt to connect that party to the agent who is qualified in the same language. This increases the efficiency of the agents because they are able to communicate with the customer in a language familiar to both the customer and the agent.

Therefore, for incoming calls, the agent has been relieved of the time consuming and inefficient duties of answering the call, ascertaining the customer's account number, and keying in the customer's account number. For established clients, the agent has the customer account information on screen immediately upon being connected to the calling party. Furthermore, where the orders are placed, changed or cancelled by the calling party's use of the DTMF keypad or specified words it may not be necessary for the agent to intervene at all or, in the alternative, the agent may simply be connected in order to verbally verify the information provided by the calling party.

The agent may also be placed on hold during inbound calls. For inbound calls this frequently arises in the context of the connected party being temporarily interrupted to attend to some other task, or the party in interest having that party's secretary place the call and once connected, ask the agent to please hold for Mr. X. Regardless of whether the call is an inbound call or outbound call, on-hold time is non-productive, wasted time. Therefore, an agent who is connected to an inbound call and who is put on hold by the calling party will also press a key to signal system controller 11 that the agent is on hold and speak the name of the calling party, if known. If the name of the calling party is not known then agent may, in place of a name, speak a phrase such as "the person who called ABC Company". Inbound cans in which the agent is placed on hold are therefore treated in the same manner as outbound calls in which the agent is placed on hold. In addition, the treatment of wrap-up or closing statements for inbound calls is the same as the treatment for wrap-up or closing statements of outbound calls. Therefore, the agent has been relieved of the time-wasting, non-productive duty of waiting on hold or conducting wrap-up statements for inbound calls.

System controller 11 is capable of controlling routing of calls in a manner which simulates an automatic call distributor/diverter (ACD). Also, if different agents handle different types of calls, such as incoming calls, outgoing calls, establish new account, place or change an order, contact regarding a delinquent account, etc., system controller 11 automatically routes the incoming or outgoing call to the next available agent which handles that particular type of call. Therefore, the order and/or selection of which agent is connected to a particular call may be controlled by system controller 11 on an ACD-like basis.

Of course, if device 13 is an ACD then device 13 may perform the automatic call distribution without intervention by system controller 11. However, it is preferred that system controller 11 program the call routing parameters under which ACD 13 operates so that maximum trunk line and agent efficiency may be obtained by dynamically adjusting the allocation of inbound lines and outbound lines, the number of trunk lines and agents dedicated to a particular campaign, etc., as described in the referenced documents.

Voice recognition module 10a32 allows some transactions to be completely handled without agent intervention and without requiring the customers to have a DTMF-type telephone. Module 10a32 provides digital output signals corresponding to a predetermined vocabulary, such as the spoken words one through nine, zero (oh), yes, no, help, cancel, and terminate. Module 10a32 may also decode DTMF tones and eliminate the need for a separate DTMF decoder 10a28.

When module 10a32 is used, instead of immediately routing an incoming call or an answered outgoing call to an operator at an agent terminal 12A, the initial contact may be handled by system controller 11 or a trunk interface control unit, such as 10a13.

When an incoming call or an outgoing call is answered trunk interface control unit 10a13 will cause message player/recorder 10a9 to begin playing the first prerecorded message. This prerecorded message contains instructions for the customer to speak the appropriate word, or words, at the end of the message, to indicate the customer's response to the message. The response elicited may be, for example, an account number, a telephone number, a "yes" or a "no", etc. Module 10a32 decodes the customer's response. Based upon the customer's response system controller 11 or trunk interface control unit 10a13 may cause message player/recorder 10a9 to play an appropriate next message, disconnect trunk T1, or connect an available agent and provide the customer's responses and/or customer's record to the agent's terminal for display on the screen.

The particular messages played, and the customer's response, such as placing an order, changing an order, etc., are then stored by trunk interface control unit 10a13, system controller 11 and/or mainframe 16. The customer's responses are also used to immediately update the customer account information in mainframe 16. Therefore, certain types of transactions can be handled without the intervention of an agent, thereby reducing the number of operators required and/or more efficiently utilizing the agent. Also, as both DTMF tones and spoken words can be recognized and acted upon, the use of module 10a32 allows transactions to be automatically conducted both with customers who have DTMF telephones and with customers who have rotary dial (pulse) telephones.

It will be appreciated that control of the call and monitoring of the customer's response need not be done solely by trunk interface control unit 10a13 or system controller 11 but may also be performed, wholly or partly, by an agent at an agent terminal 12 and/or mainframe 16.

It will also be appreciated that, in a typical environment, the message played to customer will be substantially longer than the customer's response (yes, no, cancel, etc.) to the message. Therefore, a voice recognition module, such as 10a32, could be switched, or multiplexed, between several trunks, instead of being dedicated to a single trunk. Similarly, the other resources of a trunk interface unit 10 can be Switched or multiplexed between trunks when the trunk interface unit 10 is connected to the trunks via port group B of the PBX/ACD 13. In that embodiment, the PBX/ACD 13 may perform as the switching/multiplexing device. PBX/ACD 13 will selectively connect the trunk line to trunk interface units 10. PBX/ACD 13 will seize the trunk line, route the trunk line to the trunk interface units 10, and notify the trunk interface units 10 of the connection whereby the trunk interface units 10 commence the processes of dialing, voice recognition decoding, message playing and recording, etc. These actions may be performed automatically by PBX/ACD 13 or in response to instructions from system controller 11.

Although not shown in FIG. 2, it will be understood that a similar array of devices is also connected to trunks T2-T4, and that trunk interface control unit 10a13 controls this array of similar devices via its T2I-T4I ports over buses 10a15-10a17, respectively.

System controller 11 can be used to maintain a record of the parameters (time of day, duration, busy, no answer, etc.) for each call. Also, one or more of the agent terminals 12 may be configured to run without agent intervention or assistance. In one embodiment, system controller 11 will send an indication of the call status (busy, no answer, etc.) and some record identification key to the unattended agent terminal 12. This agent terminal 12 will send the record identification key to the host 16, obtain the customer account record from the host 16, and cause the host 16 to update the record to reflect the call status.

Although reference has been made to use of account numbers and telephone numbers, it will be appreciated that other record identification keys, such as name, address, invoice number, etc., may also be used to identify and access a record.

Message player/recorder 10a9 allows information on trunk T1 to be converted to the digital form appropriate for storing the information in a memory. In the preferred embodiment, the agent will press a "record" key on terminal 12a6 and, while holding the key down, speak the name of the desired party, such as "Mr. X" or "Ms. X." While the "record" key is held down device 10a9 will convert the spoken name into a digital signal, which will be stored in memory in trunk interface unit 10a or in memory in the system controller 11. It will be appreciated that the agent audio communications device is connected to player/recorder 10a9 via PBX/ACD 13. In an alternative embodiment, the speech is recorded for a predetermined time, such as two seconds, after the "record" key is pressed.

Similarly, when it is desired to reverse the process, trunk interface control unit 10a13 or system controller 11 will cause device 10a9 to send the recorded voice signal to trunk T1. Message player 10a9 may be used to deliver a message or, alternatively, the entire message may be stored in digital form in the memory of trunk interface unit 10a or system controller 11 so that device 10a9 provides the entire outgoing message. In the preferred embodiment the message device 10a9 includes both means for converting signals, such as analog signals from an agent's audio communications device or a telephone trunk or ISDN signals from a telephone trunk, into digital signals, and means for converting digital signals into signals suitable for transmission over the telephone trunk. Although the message device 10a9 is preferably controlled by system controller 11 or trunk interface control unit 10a13, the message device 10a9 may also be directly responsive to certain signals, such as the "record" and "continue" signals, provided by an agent's data terminal. In such a configuration the trunk interface control unit 10a13 might merely function as a conduit between the data terminal and the message device for certain signals.

Figure 3:
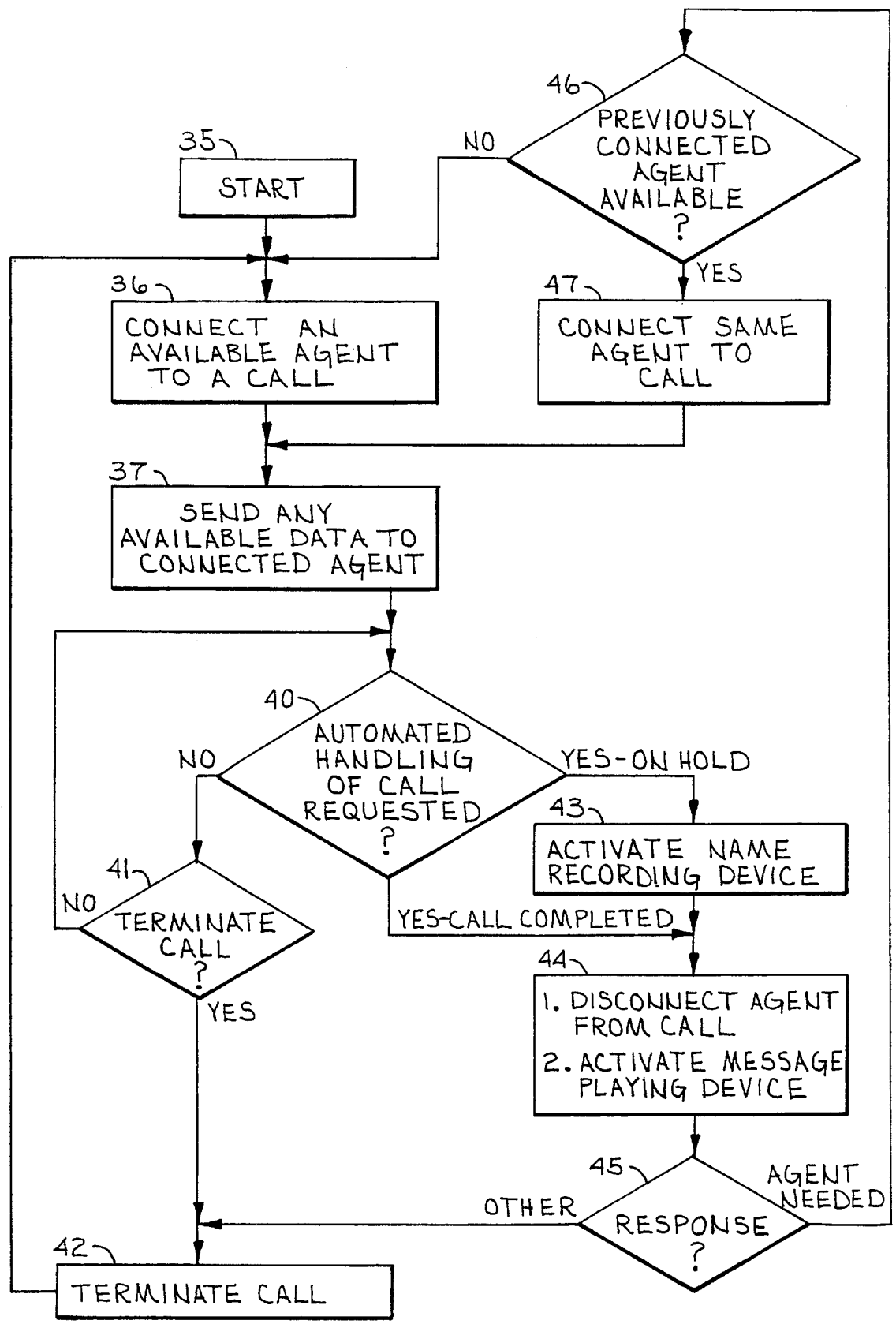
FIG. 3 is a flow chart illustrating the basic operation of the preferred embodiment of the present invention.

FIG. 3 is of a flow chart illustrating the basic operation of the preferred embodiment of the present invention. Upon starting 35, system controller 11 will cause, instep 36, an available agent to be connected to a call. In step 37 system controller 11 will cause any available data associated with that call to be sent to the connected agent. In decision 40 system controller 11 monitors whether the connected agent has requested automated handling of the call. If not then, at decision 41, system controller 11 determines whether the agent has requested termination of the call. If not then a return is made to decision 40. If so then, in step 42, system controller 11 causes termination of the call by directing an on-hook condition and by causing the agent to be disconnected. This is easily accomplished by instructing PBX/ACD 13 to release the trunk line and terminate the appropriate port group C connection.

If, at decision 40, the agent had requested automated handling and signaled that the reason was that the agent was on hold then, at step 43, controller 11 will activate the name recording device, such as message recorder 10a9. Then, in step 44, system controller 11 will cause the agent to be disconnected from the call and will activate message player 10a9. If trunk interface units 10 are connected to the trunk lines 1 through PBX/ACD 13 then controller 11 will instruct PBX/ACD 13 to switch trunk T1 from the agent (port group C) to the trunk interface units 10 (port group B). Then, in decision 45, trunk interface 10 or system controller 11 determines whether a response is expected in reply to the message. If the response indicates that an agent is needed then, at decision 46, system controller 11 will determine whether the previously connected agent is available. If not then in step 36 an available agent will be connected to the call. If so then, in step 47, the same agent will be connected to the call. After steps 36 and 47 trunk interface 10 or system controller 11, in step 37, causes any available data for that call to be sent to the connected agent.

If, at decision 45, there is a response indicating that an agent is not needed, or a message has been played which does not require a response, or there is no response at all from the connected party, then system controller 11 will proceed to step 42 whereby the call will be terminated. If, at decision 42, the connected agent requested automated handling of the call and indicated that the call was essentially completed except for the wrap-up statements then system controller 11 will proceed to step 44.

Figure 4A:
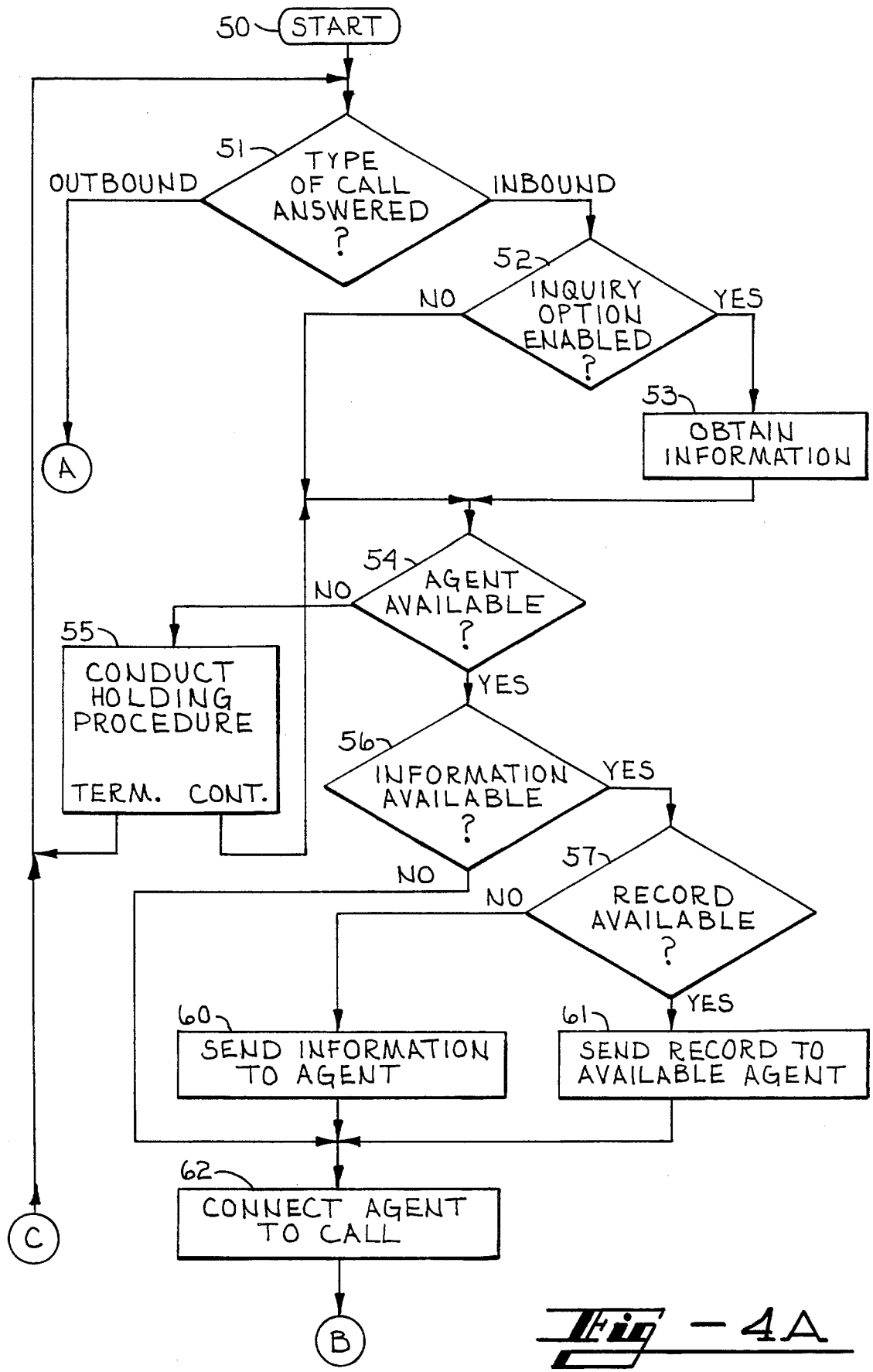
Figure 4C:
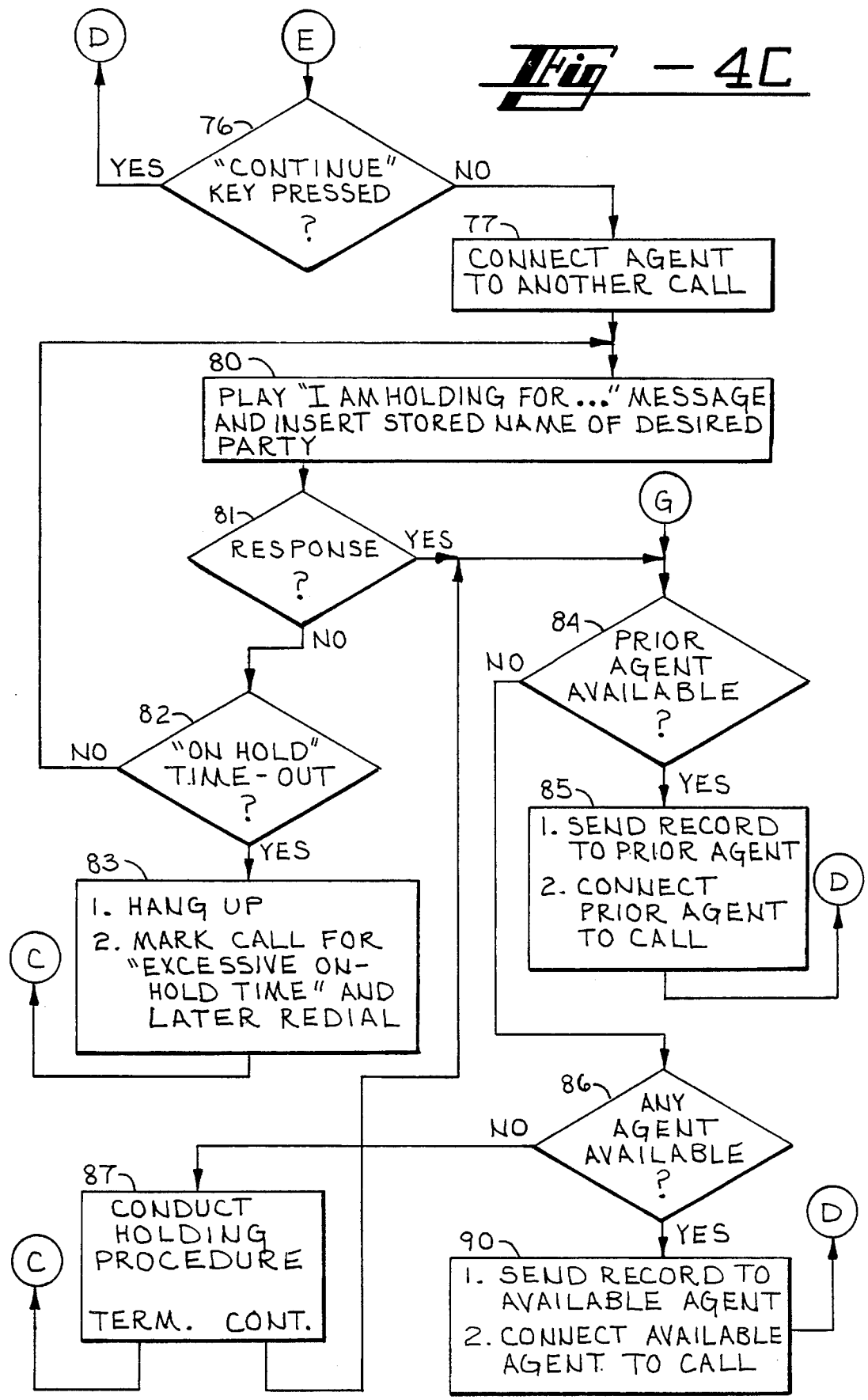
Figure 4D:
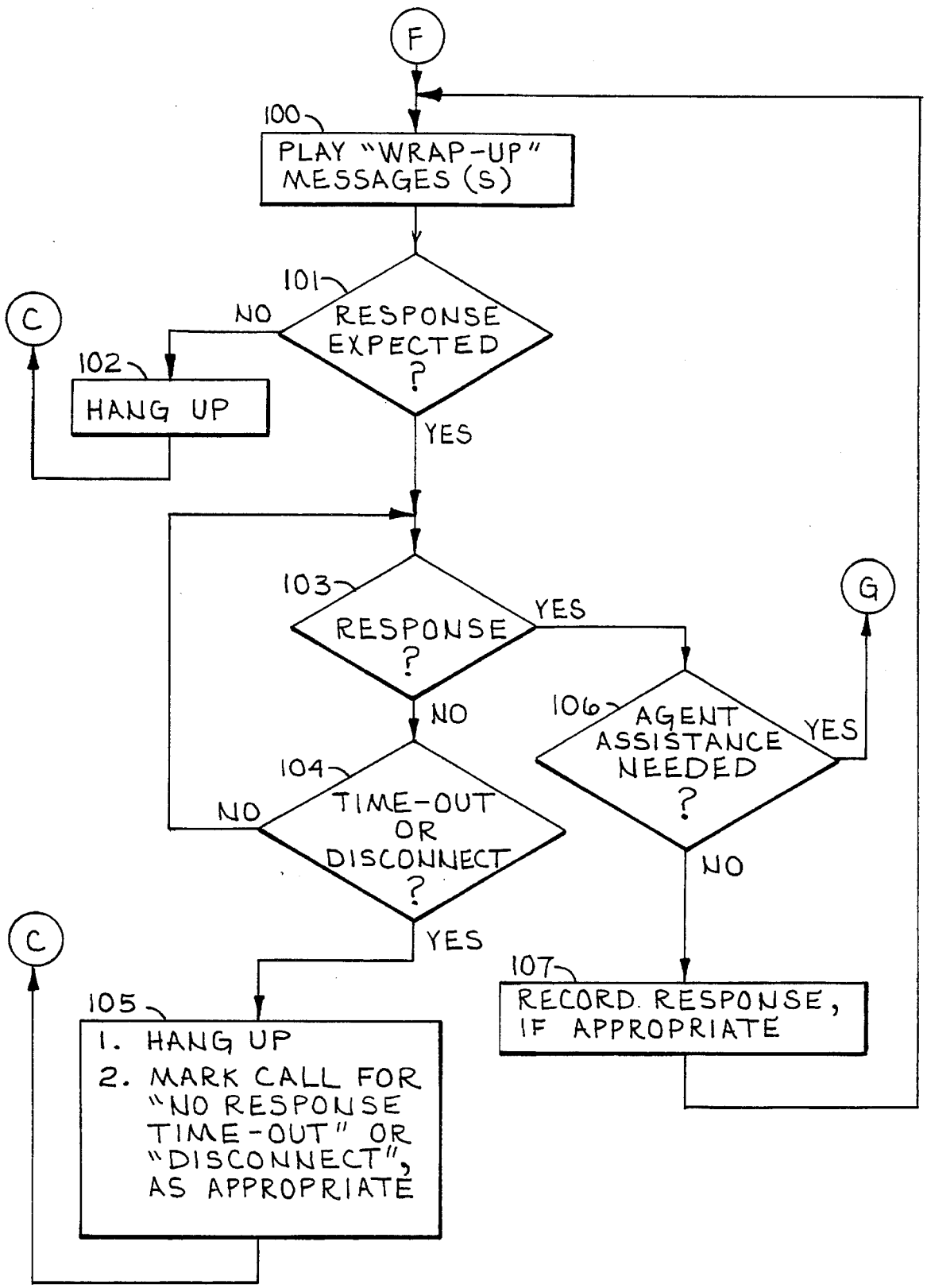

Turn now to FIG. 4 which is a detailed flow chart illustrating the preferred operation of the present invention. This operation is primarily performed by system controller 11 although many of the operations may be performed by the trunk interface units 10 or mainframe 16 without direct control by system controller 11. That is, the "intelligence" may be divided between system controller 11, the trunk interface control units in trunk interface units 10, and the mainframe 16. The division of tasks among the devices will, in general, be determined by considerations previously mentioned (memory space, processing power, customer requirements, etc.), as well as by whether the task only requires localized activity, such as that on a particular trunk, or whether the task requires additional information, such as whether a particular agent is available, when an agent is predicted to be available, etc. Therefore, references to system controller 11 should be understood as being for clarity and convenience, and not as being a limitation on what device may perform any particular function. Certain steps and decisions are performed by an agent, not by devices 10, 11, or 16, and are shown for clarity and are marked by an asterisk (*).

Upon starting 50, the first decision is to determine the type of call which has been answered. The process of obtaining a telephone number to be called, dialing the telephone number on an available trunk, monitoring the trunk for an answer to the call, and detecting when the outbound call has been answered are described in the referenced documents or are well known to those of skill in the an and will not be belabored here. Likewise, the detection of an inbound call, the automatic answering of that call, and the automatic obtaining of certain information from the calling party by the trunk interface unit and the system controller are described in the referenced documents or are well known in the art. Decision 51 therefore determines whether the call that was answered was an outbound call or an inbound call. If the call was an outbound call step 66 is executed next. If the call was an inbound call then decision 52 determines whether the inquiry option has been enabled. If so then, in step 53, trunk interface control unit 10a13 or system controller 11 will obtain information from the calling party or information about the calling party, such as ANI or DNIS information, if available. Upon completion of step 53 or, if the inquiry option was not enabled, system controller 11 determines at decision 54 whether an agent is available.

The availability of an agent is not necessarily determined simply by whether or not the agent is currently connected to a party. In the preferred embodiment agent availability is also a function of call pacing and inbound call rate prediction. For example, the agent may have completed, or maybe predicted to be about ready to complete, a current call. However, that agent may not be available because that agent has already been assigned to handle a particular call once the current call has been completed.

If an agent is not available then the holding procedure is conducted in step 55. Holding procedure 55 has two output possibilities: termination (TERM.), and continuation (CONT.). Holding procedure 55 is explained in more detail below. If the termination output is selected then system controller 11 returns to decision 51. If the continuation output of holding procedure 55 is appropriate then system controller 11 returns to decision 54.

If, at decision 54, an agent is available, then decision 56 determines whether any information is available. This is the information that would have been obtained in step 53. If information is not available then step 62 is executed next. If information is available then decision 57 determines whether a record is available for the calling party. Based upon the information obtained, such as an account number, a telephone number, or other information, system controller 11 will first determine whether a record is available in the data contained in the memory of system controller 11. If not then system controller 11 will request the record from mainframe computer or other host 16. If a record is still not available, then system controller 11 will cause, in step 60, the information to be sent to the agent and will then proceed to step 62. If a record is available then, in step 61, system controller 11 will send the record to the available agent, or cause the record to be sent to the available agent, and then proceed to step 62. In step 62 system controller 11 connects the agent to the call. As is well known, this is accomplished by sending an instruction to PBX/ACD/switch 13 to connect the trunk line for the incoming call to the audio communication means of the available agent.

In step 63 the agent transacts the business that is necessary. This may involve taking an order, verifying information, discussing a payment schedule, etc. Decision 64 follows, or may be part of, the process described in step 63.

If at decision 51 the type of call answered is an outbound call then, in step 66, the record for the called party is sent to the available agent. Many states prohibit the dissemination of collection information or other types of information to anyone except the customer. Therefore in step 67 the agent asks for the desired party in order to verify that the correct party has answered the outbound call. The agent then determines, in decision 70, whether the desired party is the party to whom the agent is connected. If so then the agent proceeds to transact the desired business in step 63. If the desired party is not the party who answered the call then the agent will ask whether the desired party is available in step 71. If the desired party is not available then, in step 72, the agent will press a key, at the agent terminal which indicates that the desired party was not available and that the call should be placed again at a later time. The agent may also enter a time at which the desired party will be available, if that information was communicated to the agent. At this point the agent is released from the call and system controller 11 returns to decision 51.

If, at decision 71, the desired party was available then the agent may request that the desired party come to the telephone. If the telephone number called was a home telephone number then the answering party may simply place the handset down on a table or counter while they attempt to locate the desired party. If the telephone number called is an office telephone number and a receptionist or secretary answered the call then the agent may be placed "on-hold" while an attempt is made to locate the desired party. Also, in step 63, the agent may be transacting business with the desired party and the desired party may be temporarily interrupted to attend to another matter. Therefore, in decision 64, the agent determines whether the business transaction is essentially complete. If so and automated voice wrap-up is desired then the agent presses a key which indicates that the transaction has been completed and that automated wrap-up is needed. System controller 11 then proceeds to execute step 100. If the business transaction is essentially complete but automated wrap-up is not desired then the agent will press a different key which indicates that the transaction had been completed but that automated wrap-up is not needed. In this case system controller 11 will mark the call as completed and cause an on-hook condition on the trunk in step 68, and will then return to decision 51. If the agent determines that the transaction is not complete then, in decision 65, the agent determines whether the desired party will be unavailable for a sufficient time for the agent to be considered to be "on-hold". If not then the agent will return to decision 70. If, at decision 65, the agent determines that the agent is in an on-hold condition then the agent communicates this condition to system controller 11 via the "record" key or keys.

System controller 11 determines, in decision 73, whether the "record" key or keys have been pressed. If not then system controller 11 takes no action and the agent returns to decision 70. If the record key has been pressed then, in step 74, the agent speaks the name of the desired party while pressing the "record" key. In step 75, while the record key is depressed trunk interface control unit 10a13 will record the spoken name of the desired party, either automatically in response to information on buses 4 or 5 indicating the record key has been depressed or as a result of a command from system controller 11 in response to the signal indicating that the record key has been depressed. In one embodiment the recording process continues so long as the agent is pressing the "record" key. In another embodiment, the conversion and storage process will occur for a predetermined time, such as two seconds, after the agent has pressed the "record" key. In another embodiment, the conversion and storage process is initiated when agent presses the "record" key and continues until the agent presses another key or presses the record key again, or until a longer timeout period has expired. If the agent determines that the agent has incorrectly pronounced the name of the desired party then the agent may cause the stored name to be erased and the proper pronunciation or name to be stored by simply pressing a "continue" key and/or the record key, and repeating step 74, which causes system controller 11 to reexecute step 75. It may happen that, as the agent is speaking the name of the desired party, the desired party, or someone else, returns to the telephone. If so then the agent will want to indicate to system controller 11 that the agent wishes to continue on that call and not be released. This is accomplished by the agent pressing the "continue" key or another appropriate key. In decision 76 system controller 11 determines whether the "continue" key has been pressed. If so then system controller 11 will allow the agent to continue on the call and therefore a return will be made to decision 70.

If the "continue" key is not pressed within a predetermined amount of time after the release of the "record" key then, in step 77, system controller 11 connects the agent to another call. In step 80 system controller 11 causes a message to be played on the trunk line for the connected party. System controller 11 accomplishes this using message player 10a9. System controller 11 will retrieve, from its memory or the memory of trunk interface control unit 10a13, the converted and stored name of the desired party. System controller 11 will send, or cause trunk interface control unit 10a13 to send, this information to message device 10a9 so that, when someone returns to the telephone, they will hear a message, such as: "I am calling for (desired party). When (desired party) has returned, or if you need to speak with an agent, please press any key on your telephone or say the word 'yes' clearly and distinctly." of course, (desired party) would be an actual name, such as "Mr. Smith" or a phrase, such as "the person who called ABC Company". This message instructs the returning party as to the action that needs to be taken to obtain the return of an agent. For parties who have DTMF telephones a response is easily provided by pressing any of the keys. The DTMF tones are decoded by DTMF decoder 10a28. For those persons who do not have a DTMF telephone the voice recognition module 10a32 decodes certain specified words so that the party may signal his/her return.

At decision 81 system controller 11 monitors, via decoder 10a28 or module 10a32, the connected trunk line for a response from a returning party. If there is not a response then, at decision 82, trunk interface unit 10a or system controller 11 determines whether there is an "on-hold" time out. If not, a return is made to step 80 where the message is played again. If a time out has occurred then, in step 83, system controller 11 causes hang up (an on-hook condition) of the trunk line, marks the call for later redial, and indicates that the call was terminated because the connected party put the agent on hold for an excessive time.

If, at decision 81, there is a response then system controller 11 will determine, at decision 84, whether the prior agent is available. If the prior agent is available it is preferred to connect the call to that agent because that agent may already be familiar with the business being transacted because of the earlier exposure to the customer or the customer record. Therefore, in step 85, system controller 11 sends, or causes mainframe 16 to send, the record to the prior agent and then causes this agent to be connected to the call. A return is then made to decision 70.

If the prior agent is not available then, at decision 86, system controller 86 determines whether any agent is available. If not then, in step 87, system controller 11 conducts the holding procedure described below. The holding procedure has two outputs: termination and continuation. If termination is appropriate then a return is made to decision 51. If continuation is appropriate then a return is made to decision 84. If system controller 11 determines at decision 86 that an agent is available then, at step 90, system controller 11 will send, or cause mainframe 16 to send, the record for the connected party to the available agent and connect the available agent to the call. It will be appreciated that whenever a record is sent to an agent the preferred embodiment provides the most current record for that connected party to that agent using online updating techniques such as those described in the above-referenced documents. However, an older record, such as a record previously downloaded from a host, may be used if desired.

If, at decision 64, the agent determined that the transaction was complete and automated wrap-up was needed then system controller 11 will execute step 100, which comprises playing one or more "wrap-up" messages. These messages may be simple messages which thank the connected party for his/her time and attention or for placing an order, or may be interactive messages which are intended to elicit a response. System controller 11 will cause these messages to be played via message player 10a9. In the preferred embodiment, each agent has previously recorded a series of standard "wrap-up" messages in that agent's own voice. System controller 11 will therefore play the wrap-up messages using the voice of the operator who was last connected to the call. In an alternative embodiment, the wrap-up messages are previously recorded but not necessarily in the voices of the agents.

Decision 101 determines whether a response is expected to the wrap-up message. If not then, at step 102, system controller 11 causes trunk interface unit 10a or switch/PBX/ACD to release the trunk (go on hook). A return is then made to decision 51. If a response is expected then decision 103 determines whether a response was received. If a response was not received then, in decision 104, trunk interface 10a or system controller 11 determines whether a no-response time-out occurred or if a disconnect occurred (the other party hung up). If not then a return is made to decision 103. If so then, at step 105, the trunk is released and system controller 11 hangs up and marks the call for a "no-response time-out" or a "disconnect", as appropriate. This allows a supervisor to, if desired, review the transaction record for calls so marked and determine whether or not a follow up telephone call is appropriate.

If, at decision 103, a response is present then, at decision 106, trunk interface 10a or system controller 11 evaluates the response to determine whether agent assistance is needed. If so then a return is made to decision 84. If not then, in step 107, trunk interface 10a or system controller 11 records the response, if appropriate. A return is then made to step 100 to play the next wrap-up message.

In the preferred embodiment, an agent will initially log in and provide an agent identification (ID) number. System controller 11 will then keep track of the station where that operator is located. If an agent logs off system controller 11 will mark that agent as being unavailable. When an agent moves from one agent terminal to another agent terminal system controller 11 will note the new location of the agent. Also, prerecorded messages may be made using the agent ID number so that system controller 11 can associate each prerecorded message with the agent that made that message. In an alternative embodiment it is assumed that each agent terminal is dedicated to a particular agent so system controller 11 will simply keep track of the station which was associated with the call or prerecorded messages.

In the holding procedure, in step 120, system controller 11 causes a "next available agent" message to be played. This message thanks the connected party for holding and advises them that they will be connected to the next available agent. Of course, a connected party may eventually tire of waiting for an agent. Therefore, decision 121 tests whether a time-out condition has occurred. If so then, at step 122, system controller 11 causes an "apology" message to be played. This message thanks the connected party for holding, apologizes for the delay, and asks the connected party to indicate whether the party will wait. In the preferred embodiment system controller 11 also provides to the connected party, via message device 10a9, an indication of the status of the connected party, such as a stated amount of time before an agent will be available, an additional unstated amount of time, and/or an indication of the number of parties in the holding queue ahead of the connected party. The prediction of the wait time is described below. The connected party may be asked to indicate their preference by, using a DTMF telephone, keying in a "1" to indicate that the connected party will wait or a "2" to indicate that the connected party will not wait. The connected party may also indicate a preference by stating "yes" to indicate that the party will wait or "no" to indicate that the party will not wait. Additionally, a "no" will cause the connected party to be asked to indicate the best time for a return phone call and/or whether a different telephone number is desired for the return phone call. The connected party may provide this information by keying in, for example, a "3" followed by a time to indicate the best time for the returned call, and/or "4" followed by a telephone number to indicate a better telephone number for a returned call. If the connected party does not provide a time or a different telephone number for the returned call then, when an agent becomes available, system controller 11 will cause a return call to be placed. If the connected party has indicated a preferred time or telephone number then system controller 11 will cause the call to be placed in accordance with these customer preferences. However, system controller 11 will disregard the time request if the requested call back time is not within the hours permitted by applicable law, such as, no calls after 9:00 p.m. Also, system controller 11 may disregard the specified telephone number if the telephone number is in a different area code or, if so programmed, in a different exchange. In order to prevent valuable information from being lost, system controller 11 does not overwrite the telephone number for that customer in system controller 11 or mainframe 16 but simply marks the record to indicate that number as an alternate or preferred telephone number. Additionally, if not previously obtained in step 53, system controller 11 will cause messages to be played which prompt the connected party to leave, by DTMF tones or voice, pertinent information such as a telephone number or an account number. If the party is connected as a result of an outbound call then it is generally not necessary to obtain the telephone number because this information was already available so that the outbound call could be placed.

Again, the signals are processed by decoder 10a28 and voice recognition module 10a32 and the resultant signal provided to system controller 11 for action. If, at decision 123, the party indicates that he/she will wait then the continuation (CONT.) output of the holding procedure is selected. If, at decision 123, the party is providing additional information, such as a time to return the call, a different telephone number, an account number, or other information which was not obtained in step 53, then, in step 128, system controller 11 will cause interactive messages to be played and responses from the customer to be recorded until system controller 11 has obtained all the information which the customer is willing to provide. A return is then made to step 122. However, if an agent becomes available then the party will be connected to the agent. If, at decision 123, the connected party indicates that he/she will not wait then system controller 11 proceeds to decision 125. If, at decision 123, there is no response then, at decision 124, a determination is made as to whether a disconnect has occurred (the connected party hung up). If not then the CONT. output is selected. If so then decision 125 is executed.

Decision 125 determines whether information was obtained in step 53 or step 128 for the connected party or the call was an outbound call. If so then the call is marked for an "agent not available" disconnect and later redial. The call is marked in this way so that when the call is later returned the agent will know to apologize for the previous inconvenience to the connected party. In step 127 system controller 11 causes the trunk line to be released. If, at decision 125, information has not been obtained and the call was not an outbound call then step 127 will be executed. It will be appreciated that the information obtained includes any ANI or DNIS information provided by the telephone company. The output of step 127 is the TERM. output of the holding procedure.

FIG. 4F is an illustration of the procedure used to advise the connected party of his/her holding status. In the preferred embodiment this procedure is implemented by system controller 11 but the procedure can be implemented by any device which has access to the necessary information. Upon starting 150, system controller 11 will, in step 151, project the time to availability of each agent, individually, based upon whether that agent is currently handling an inbound call or an outbound call. System controller 11 maintains separate statistics for each individual agent and, in addition, categorizes the statistics as pertaining to an inbound call or to an outbound call. A sliding window is used so that only the last M statistics for inbound calls and the last N statistics for outbound calls are used for each agent. In the preferred embodiment, M and N are both equal to 20. This figure is not critical and a higher number may be used to obtain a more constant projected time or a lower number may be used to cause the projected time to respond more rapidly to variations in the calls handled by the agent.

In step 152 system controller 11 designates each agent, individually, to next handle an inbound call or an outbound call, based upon the inbound call/outbound call priority designated by the user. The designation of agents to next handle inbound calls or outbound calls is described in the referenced documents. In addition, step 152 ranks the agents designated to handle inbound calls based upon the predicted time to availability of each agent and also ranks the agents designated to handle outbound calls based upon the predicted time to availability of each agent.

In step 153 system controller 11 categorizes each party on hold as being in an inbound call holding queue or an outbound call holding queue.

In step 154 system controller 11 assigns a priority number to each call in the inbound holding queue. In the preferred embodiment, calls which have been on hold the longest have the highest priority. Likewise, system controller 11 will assign a priority number for each call in the outbound call holding queue. The same criteria is used to assign the priority of the calls in the outbound holding queue.

In step 155 system controller 11 matches the priorities of the inbound calls to the ranking of the agents designated to handle inbound calls. Likewise, the priorities of the outbound calls are matched to the ranking of the agents designated to handle outbound calls. Therefore, an inbound party on hold who has been assigned a priority of 3 will be matched with the time that a third agent becomes available who is designated to handle inbound calls. If the third agent is expected to be available in two minutes then the party will be advised that it projected that an agent will be available in two minutes. The same procedure is used for outbound calls. In the preferred embodiment, this procedure is executed on a continuous basis but the party on hold is only notified of the predicted time to agent availability at periodic intervals, such as every thirty seconds. The interval time is a matter of preference and other times may be used. In the preferred embodiment, as shown above, the projections are used in step 122.

In an alternative embodiment the time prediction is not provided to the party on hold. Therefore, even though steps 151,152 and 155 may be used for other purposes, only steps 153 and 154 are used to inform the holding party of his/her status. In this alternative embodiment the party on hold is simply advised of how many parties are in the inbound or outbound holding queue ahead of that party. In another embodiment, both time and the number of parties ahead are provided to the party on hold.

In still another alternative embodiment, no distinction is made between inbound calls and outbound calls for predicting agent availability and/or categorizing and assigning the priority to the parties on hold. Therefore, it should be understood that the present invention is not limited to use with the algorithm described above but may be used with any call pacing algorithm.

It will be appreciated that providing this information to the party on hold allows the party on hold to make an informed decision as to continue holding, call back at a later time, request that a returned call be placed, conduct the transaction without an agent using tone decoding and voice recognition, begin conducting the transaction without an agent, etc.

It will be appreciated from the above that the present invention describes a method and an apparatus which improves the efficiency of an agent by reducing or eliminating the "on-hold" time of the agent. In addition, agent efficiency is further improved by reconnecting the same agent that was previously connected to the other party. This is advantageous in that the agent is already familiar with the customer record by virtue of the previous exposure. In addition, closing or "wrap-up" statements, which typically require little or no response from the connected party, are prerecorded so that these may be done by the system and not by the agent. In addition, to maintain apparent continuity with the connected party, the messages or statements played are preferably in the voice of the agent who was last connected to the party. Furthermore, an indication of the holding status is provided to the connected-on-hold party. It will be appreciated that messages which do not require the name of a party may be entirely prerecorded and activated by the agent pressing a designated key or keys. As in the case with the record key, the agent will then be disconnected from the current call and connected to the next call. Of course, other embodiments of the present invention may suggest themselves to those of skill in the art based upon a reading of the foregoing disclosure. Therefore, the present invention is to be limited only by the claims below.

I claim:

1. For use with a system which places outbound calls to and receives inbound calls from a plurality of parties, which selectively connects ones of said plurality of parties to ones of a plurality of agents, which selectively places ones of said plurality of parties on hold, and which uses a call pacing algorithm to control the rate of placement of said outbound calls, a method for advising a party who is placed on hold, comprising the steps of:

measuring call handling times for each agent of said plurality of agents;

providing said call handling times for each said agent to said call pacing algorithm;

receiving, for each said agent and from said call pacing algorithm, a prediction of time remaining until each of said agents becomes available;

ranking said agents based upon said time remaining for each agent;

determining a priority status for each party who is placed on hold;

ranking said parties who are placed on hold based upon said priority status;

matching a party on hold with an agent, based upon said ranking of said agents and said ranking of said parties; and providing, to a said party on hold, a statement of said time remaining for a said agent which was matched to said party.

2. The method of claim 1 wherein said step of determining a priority status comprises:

determining a holding time for each party who is placed on hold; and ranking said parties who are placed on hold based upon said holding time for each party.

3. An apparatus for improving service to parties, said parties including both called parties and calling parties, said apparatus comprising:

a plurality of agent terminals staffed by a corresponding plurality of agents;

means for connecting selected ones of said parties to selected ones of said agents at said agent terminals, or placing selected ones of said parties on hold;

control means for measuring call handling times for each of said agents, for providing said call handling times for each said agent to a call pacing algorithm to obtain a prediction of time remaining until each of said agents becomes available, for ranking said agents based upon said time remaining for each agent, for determining a priority status for each party who is placed on hold, for ranking said parties who are placed on hold based upon said priority status for each party, and for matching a party on hold with an agent, based upon said ranking of said agents and said ranking of said parties; and means for providing to each said party on hold a statement of said time remaining for said agent matched to said party.

4. The apparatus of claim 3 wherein said means for determining a priority status comprises means for determining a holding hold time for each party who is placed on hold, and means for ranking said parties who are placed on hold based upon said elapsed holding time for each party.

* * * * *